April 21, 1931. R. J. GITS 1,802,051
RESERVOIR GREASE CUP
Filed July 3, 1928
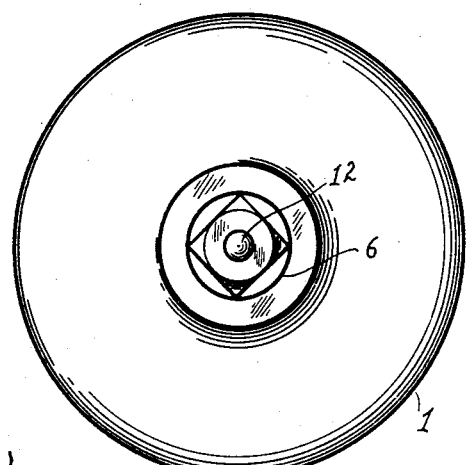
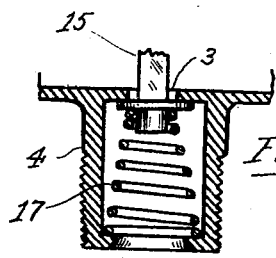
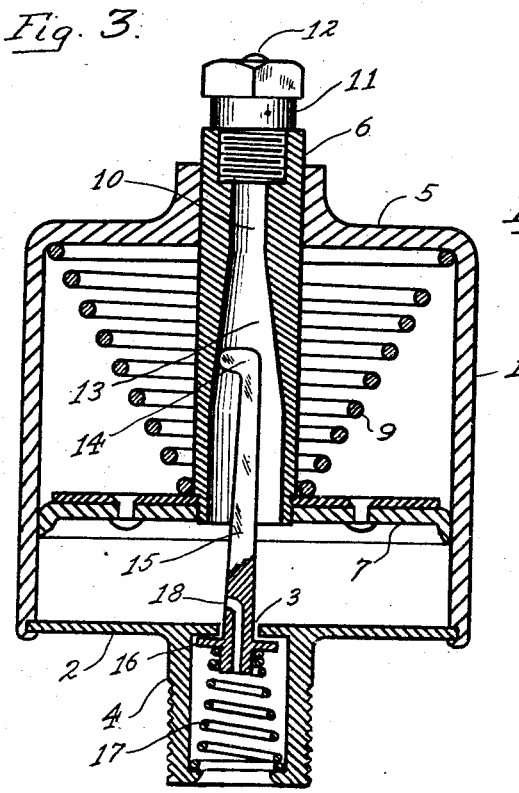
INVENTOR
Remi J. Gits,
BY William E. Hann
ATTORNEY Patented Apr. 21, 1931

1,802,051

UNITED STATES PATENT OFFICE

REMI J. GITS, OF CHICAGO, ILLINOIS

RESERVOIR GREASE CUP

Application filed July 3, 1928. Serial No. 290,212.

This invention relates to the construction of grease cups.

The main objects of this invention are to provide an improved form of grease cup of the character which will deliver a substantially uniform quantity of lubricant at all times; to provide a grease cup of this character which has an improved form of discharge valve which will vary the flow of lubricant in accordance with the position of the spring controlled piston which discharges the lubricant from the cup; to provide a simplified and improved form of cup which automatically compensates for the different strengths exerted by the piston actuating spring and to provide a generally improved construction which can be manufactured at a relatively low cost.

An illustrative embodiment of this invention is shown in the accompanying drawings in which Fig. 1 is a top plan view of the complete device.

Fig. 2 is a vertical medial sectional view of the same, showing the interior construction of the device.

Fig. 3 is a fragmentary sectional detail showing the discharge control valve in its closed position.

In the construction shown in the drawings a cylindrical cup 1 adapted to contain a lubricant is provided with a bottom plate 2 rigidly secured thereto which has a discharge opening 3 centrally located therein. A depending tubular shank 4 is integrally formed on the bottom 2 and is exteriorly threaded for attaching the cup to the bearing to be lubricated. The discharge opening 3 is preferably centrally located and provides communication between the interior of the cup 1 and the interior of the tubular shank 4.

The top end 5 of the cup 1 is provided with a centrally located opening therethrough in which is slidably mounted a piston rod 6.
The lower end of the piston rod 6 carries a lubricant discharge piston 7 rigidly secured thereon and which is adapted to move or slide axially within the cup 1 in the usual manner, a cone shaped helical compression spring 9 being provided for normally urging the piston 7 downwardly in the cup 1 toward the discharge opening 3.

The piston rod 6 is provided with an axial bore 10 through which lubricant may be introduced into the cup underneath the piston 7. The outer end of the bore is threaded to receive a nipple 11 of the character shown and described in my Patent Number 1,676,086 issued July 3, 1928. The nipple 11 is provided with an outwardly closing spring pressed ball valve 12 which retains the lubricant within the cup after having been introduced therein.

A portion of the bore 10 is tapered as shown at 13 to provide a sloping surface for contacting with the head 14 on the upper end of a valve stem 15 which extends through the discharge opening 3 and has a relatively loose fit therein. The lower end of the valve stem 15 is provided with an annular flat faced valve 16 which is yieldingly urged to close the discharge opening 3, as shown in Fig. 3, by a helical compression spring 17 mounted within the tubular shank 4.

The valve 16 and valve stem 15 have a relatively small lubricant discharge passage-way 18 therein which communicates at its inner end with the interior of the cup 1 and at its outer end with the interior of the shank 4.

The valve stem 15 being loosely mounted in the discharge opening 3, the valve 16 can be tilted as shown in Fig. 2, so as to open the passage-way 3, the amount of such opening and the area through which lubricant can pass being determined by the amount which the valve is tilted.

In the operation of this grease cup, lubricant is introduced into the cup through the nipple 11 by a grease gun of the character shown and described in my above mentioned patent. The grease passes down through the bore 10 to the interior of the cup under the piston 7 thereby sliding the piston 7 upwardly in the cup against the action of the spring 9, until the cup is filled. Upward movement of the piston 7 slides the piston rod 6 out through the top of the cup and the amount of lubricant in the cup can thereby be estimated at any time by reference to the distance the piston rod 6 projects from the top of the cup.

When the cup is substantially filled with lubricant the head 14 on the upper end of the valve stem 15 occupies the relatively large lower end of the bore 10 and is free from contact with the interior wall thereof. The spring 17 is of sufficient strength to seat the valve 16 against the lower marginal edge of the discharge opening 3 as shown in Fig. 3 of the drawings.

When in such position lubricant from the cup 1 is discharged to the bearing through the passage-way 18 which is of sufficiently small size so as not to permit an excess of lubricant to be discharged when the piston spring 9 is in its fully compressed position and thereby exerting its greatest force on the lubricant in the cup.

As the lubricant is discharged from the cup through the passage-way 18, spring 9 causes the piston 7 to travel downwardly in the cup and as is well understood the further the piston travels the weaker will become the force exerted by the spring 9. When the piston 7 has traveled a short distance the head 14 on the top end of the valve stem 15 will contact with the tapered interior portion 13 of the bore 10 and begin to tilt the valve 16 off of its seat thereby permitting lubricant from the cup to also pass out through the discharge opening 3. The further the piston 7 travels downwardly, the greater will be the tilt and the larger will be the opening around the valve stem through which the lubricant can pass out into the tubular shank 4.

Although but one specific embodiment of this invention has been herein shown and described, it will be understood that details of the construction shown may be altered or omitted without departing from the spirit of this invention as defined by the following claims.

I claim,—

1. A device of the class described comprising a cup adapted to contain a lubricant, said cup having a discharge opening therein, a piston slidable in said cup, yielding means for urging said piston towards said discharge opening, means for introducing lubricant into said cup under said piston, a valve tiltably mounted in said discharge opening and means on said piston for tilting said valve to vary the area of said discharge opening in accordance with the position of said piston in said cup.

2. A device of the class described comprising a cup adapted to contain a lubricant, said cup having a discharge opening therein, a piston slidable in said cup, a piston rod on said piston having a tapered passage-way therethrough, yielding means for urging said piston towards said discharge opening, means for introducing lubricant into said cup through said piston rod passageway, a valve tiltably mounted in said discharge opening, a valve stem on said valve extending into said piston rod passage-way, said piston rod having a surface adapted to engage said valve stem for tilting said valve to vary the area of said discharge opening in accordance with the position of said piston in said cup.

3. A device of the class described comprising a cup adapted to contain a lubricant, said cup having a discharge opening therein, a piston slidable in said cup, yielding means for urging said piston towards said discharge opening, a piston rod on said piston, means for introducing lubricant into said cup under said piston, a valve for said discharge opening, a valve stem for said valve extending through said discharge opening and loosely fitting therein, yielding means bearing against said valve for normally holding said valve to close said discharge opening, said valve and valve stem having a lubricant discharge passage-way therethrough communicating with the interior of said cup, said piston rod and valve stem having cooperating sliding engagement for moving said valve to vary the area of said discharge opening in accordance with the position of said piston in said cup.

4. A device of the class described comprising a cup adapted to contain a lubricant, said cup having a discharge opening therein, a piston slidable in said cup, yielding means for urging said piston towards said discharge opening, a piston rod on said piston having a tapered passageway therethrough, means for introducing lubricant into said cup under said piston, a valve for said discharge opening, a valve stem for said valve extending through said discharge opening and loosely fitting therein, the upper end of said valve stem extending into said piston rod passage-way, yielding means bearing against said valve for normally holding said valve to close said discharge opening, said valve and valve stem having a lubricant discharge passage-way therethrough communicating with the interior of said cup, said piston rod and valve stem having cooperating sliding engagement for tilting said valve to vary the area of said discharge opening in accordance with the position of said piston in said cup.

5. A device of the class described comprising a cup adapted to contain a lubricant, said cup having a discharge opening therein, a piston slidable in said cup, a piston rod on said piston having a passage-way therethrough, yielding means for urging said piston towards said discharge opening, means for introducing lubricant into said cup through said piston rod passage-way, a valve movably mounted in said discharge opening, a valve stem on said valve extending into said piston rod passage-way, said valve and valve stem having a lubricant discharge passage-way therethrough communication with the interior of said cup, said piston rod having a surface adapted to engage said valve stem for tilting said valve to vary the area of said discharge opening in accordance with the position of said piston in said cup.

In testimony whereof I have hereunto set my hand at Chicago, Illinois, this 28th of June, 1928.

REMI J. GITS.